United States Patent [19]
Cummins

[11] 3,729,163
[45] Apr. 24, 1973

[54] REAR-VIEW AUTOMOTIVE MIRROR

[76] Inventor: Wayne Cummins, 515 A Blackwood Avenue, Franklinville, N.J. 08322

[22] Filed: Dec. 20, 1971

[21] Appl. No.: 209,686

[52] U.S. Cl. ................................................248/487
[51] Int. Cl. ................................................B60r 1/06
[58] Field of Search ...................... 248/285, 293, 480, 248/487

[56] References Cited

UNITED STATES PATENTS

| 3,372,897 | 3/1968 | Lee | 248/480 |
| 3,228,643 | 1/1966 | Shilling | 248/480 UX |
| 3,013,761 | 12/1961 | Barnes | 248/293 |
| 3,028,136 | 4/1962 | Vento | 248/293 |

Primary Examiner—William H. Schultz
Attorney—Robert K. Youtie

[57] ABSTRACT

An automotive rear-view mirror for attachment to a fender wherein an upper framework is attached to an inner fender edge for extension laterally outwardly over the fender, a depending frame member extends between the upper framework and the lower fender edge, and a mirror is carried on one end of an arm, the other end being connected to an intermediate region of the upper framework for swinging movement of the arm between an outer operative position and an inner inoperative position, and upstanding struts on the upper framework for selectively supporting the arm in respective positions of the latter.

5 Claims, 4 Drawing Figures

Patented April 24, 1973
3,729,163
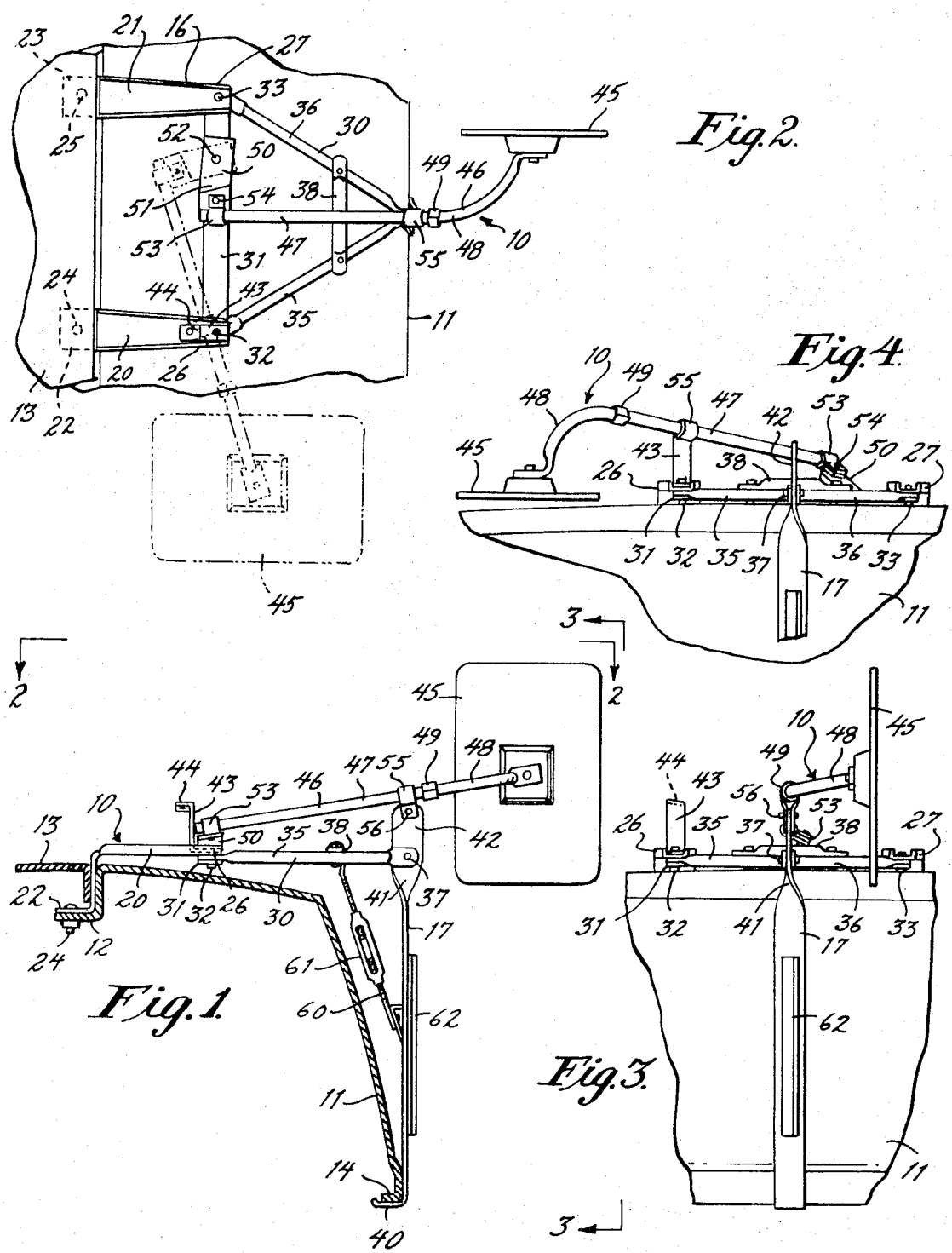
INVENTOR.
WAYNE CUMMINS
BY
Robert K. Youtie
ATTORNEY.

REAR-VIEW AUTOMOTIVE MIRROR

BACKGROUND OF THE INVENTION

As is well known to those versed in the automotive arts, there has in the recent past been a very substantial increase in trailering of campers, mobile homes, boats, and the like, all of which require better rear-view vision than is afforded by the usual automotive side mirror. In particular, it is desirable to provide a rear-view side mirror which is of larger operative or reflective area, and which may extend somewhat further from the towing vehicle, which desiderata will afford enhanced rearward view during trailering.

Prior rear-view automotive mirrors of the general type referred to above have not been entirely satisfactory, usually involving relatively large, complex and expensive supporting structures which have proved too easily subject to malfunction, such as failure to hold adjustment, and the like, being unduly expensive both to manufacture and install, and which have lacked convertibility to a relatively protected nonuse condition so that these prior devices have always been relatively exposed to highway hazards even when not in use.

SUMMARY OF THE INVENTION

Accordingly, it is an important object of the present invention to provide a rear-view automotive mirror of the type described which affords the requisite enhanced rearward vision for towing of trailers of all types, and overcomes the above-mentioned difficulties, being relatively simple, staunch and durable in structure to effectively resist damage and loss of adjustment during use, being relatively inexpensive to manufacture and easy to install, and which is quickly and simply convertible from a highly effective operative position to a uniquely protected inoperative position to reduce the possibility of damage or other road hazards when not in use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a rearwardly facing sectional elevational view showing a mirror of the present invention in an operative condition of association with the fender of a vehicle.

FIG. 2 is a top plan view taken generally along the line 2—2 of FIG. 1, illustrating an inoperative condition in dot-and-dash outline.

FIG. 3 is a side elevational view showing the structure as seen along the line 3—3 of FIG. 1.

FIG. 4 is a partial side elevational view similar to FIG. 3, but illustrating the nonuse condition.

DESCRIPTION OF THE PREFERRED EMBODIMENT

Referring now more particularly to the drawings, and specifically to FIGS. 1 and 2 thereof, the rear-view automotive mirror of the present invention is there generally designated 10, and is illustrated in position mounted on an automotive fender 11. In the conventional manner, the fender 11 may terminate inwardly along an inner edge region 12 adjacent to a hood 13, and the fender may extend laterally outwardly and thence downwardly to terminate at a lower edge region or margin 14.

The mirror 10 may include an upper framework 16 which extends over the fender 11, being connected to the inner fender region 12 and extending laterally outwardly therefrom. Depending from the upper framework 16 at the laterally outward region thereof, is a frame member 17 which depends to the lower fender edge region 14 for connection thereto in a manner appearing more fully hereinafter.

More specifically, the upper framework 16 may include a pair of attachment members 20 and 21, being spaced forwardly and rearwardly along the fender 11, and extending in general parallelism from the inner fender edge region 12 laterally outwardly over the fender. The attachment members 20 and 21 may have downwardly offset laterally inner end regions 22 and 23, each secured by suitable fastening means, as at 24 and 25, to the inner fender region 12, and extending laterally outwardly to respective outer terminal regions 26 and 27 over a laterally intermediate region of the fender 11. The attachment members 20 and 21 may be of generally U-shaped cross-section, if desired, and taper laterally outwardly, or of other suitable shape and configuration having the requisite strength.

The upper framework 16 further includes a generally triangular truss structure 30, which may include an inner piece or base strip 31 extending longitudinally of the fender between and having its opposite ends secured to the outer termini 26 and 27 of respective attachment members 20 and 21, as by fastener means 32 and 33. The generally horizontal polygonal truss structure 30 may further include a pair of forward and rearward side pieces 35 and 36, each of which has an inner end secured to the outer end of a respective attachment member 20, 21, as by fasteners 32 and 33, and extend laterally outwardly in convergent relation toward each other, terminating in proximity to each other substantially directly over the outer extremity of the nether fender 11. The truss side pieces 35 and 36 may be of tubular stock, having their end regions flattened, or of other suitable material having the requisite strength. The adjacent outer ends of the truss side pieces 30 and 36 are connected together by a fastener 37, which extends generally forwardly and rearwardly, as best seen in FIGS. 3 and 4. A brace member or bar 38 may extend generally forwardly and rearwardly between the truss members 35 and 36, having its opposite ends suitably secured to intermediate regions of respective truss members.

The depending frame members 17 may be fabricated of strip or bar stock, as illustrated, or otherwise suitably fabricated, if desired, and may have its lower end region bent laterally inwardly, as at 40, to engage beneath the lower edge region 14 of the fender 11. Further, the frame member 17 may have its upper edge region axially twisted, as at 41, to pass upwardly in sandwiched relation between the adjacent outer ends of truss members 35 and 36, being secured thereto by the fastener 37. An integral upward extension of the upper end region 41 of frame member 17, as at 42, defines an upstanding outer strut for a purpose appearing presently.

Mounted on the upper framework 16, say at a forward region thereof upstanding from the forward attachment member 20, may be an additional, auxiliary upstanding strut 43. The auxiliary strut may be suitably fixed to the upper framework 16, as by the fastener 32, and may be provided on its upper end with an apertured tab 44, for a purpose appearing more fully hereinafter.

The mirror 10 may include a mirror proper 45 of the desired size and configuration, carried on an elongate arm 46. The arm may advantageously be of sectional or telescopic, adjustable construction, including a generally straight tubular part or section 47 and a generally arcuate extensile part or section 48, the latter having one end connected directly to the mirror proper 45, and having its other end extending into and telescopically adjustable with respect to the arm section 47, as by a threaded ferrule or sleeve 49. This arm structure, as described to this point, is conventional, so that further description is not necessary.

The inner end of the arm 46 is connected by a connection means 50 to the framework 16, being specifically connected to the inner side piece 31 of the polygonal truss structure 30. The connection means 50 may include an elongate member or strip 51 having one end pivotally connected to the upper framework 16, as by a fastener 52 extending through the inner side piece 31 intermediate the ends of the latter. The fastener 52 mounts the elongate connection member 51 for swinging movement about the vertical axis of the fastener. A strap or sleeve 53 is connected to the other end of the elongate connection member 51, remote from the pivot fastener 52, and may be releasably secured in embracing engagement about the laterally inner end of arm 46 and to the connection member 51 by a suitable fastener 54. A similar sleeve or strap 55 is releasably embraceably circumposed about the arm 46 at an intermediate region thereof, say adjacent to the ferrule 49, for detachable connection, as by a fastener 56, to the upper end of strut 42. In this condition, as shown in FIGS. 1, 2 and 3, the sleeves 53 and 55 are in axial alignment, and releasably clamping the arm 46 to permit of axial rotative adjustment of the arm, as well as limited axial shifting movement.

In the phantom position shown in FIG. 2, and also as shown in solid lines in FIG. 4, the arm 46 and mirror 45 have been swung to an inoperative, nonuse or storage position. That is, the fastener-pivot 52 has been released, and the fastener 56 disengaged from strut 42, so that the arm 46, its connection member 51 and mirror 45 are swingable together about the axis of pivot 52 to extend generally longitudinally of and over the fender 11. The arm 46, or at least the arm section 48, may be axially rotated to swing the mirror 45 to a downwardly facing relatively protected position, and the auxiliary sleeve 55 may be secured to the strut 43, as by engagement of fastener 56 through tab 44, and tightening of fasteners 56 and 54.

Additionally, the supporting structure of upper framework 16 and depending frame member 17 may be rigidified by the connection of an extensile and contractile elongate element 60 between the cross brace 38 and an intermediate region of the frame member 17. The elongate element 16 may include a turn-buckle 61 for length adjustment, to draw the sporting frame members tight relative to the fender 11. Further, the depending frame member 17 may be rigidified by the securement thereto of an angle member 62, or the frame member may be of other than flat bar stock, say of relatively stiff tubular construction with flattened regions, if desired.

From the foregoing, it is seen that the present invention provides a rear-view automotive mirror for attachment to a fender which is extremely simple in construction, capable of wide variation in adjustment, adapted to maintain its adjustment throughout long periods of use, being highly effective in operation, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A rear-view automotive mirror for attachment to a fender comprising an upper framework for attachment to the inner fender edge and extending therefrom laterally outward and over the fender, a depending frame member depending from the outer region of said upper framework and having its lower end engaging the lower adjacent edge region of the fender to mount said upper framework in position, a mirror arm, a mirror on one end of said arm, connection means connecting the other end of said arm to an intermediate region of said upper framework, said connection means connecting said arm for swinging movement between an operative position extending laterally beyond said upper framework and an inoperative position extending longitudinally over the fender, an upstanding strut on the outer region of said upper framework for supporting said arm in its operative position, and an auxiliary strut on the inner region of said upper framework for supporting said arm in its inoperative position, said connection means comprising an elongate member having one end connected to said upper framework for swinging movement about a generally vertical axis, and a sleeve connected to the other end of said elongate member releasably embracing said arm for axial rotative adjustment of said arm, whereby said mirror is swingable with said arm between an operative position with said mirror upright and an inoperative position with said mirror protectively positioned in downwardly facing relation.

2. A rear-view automotive mirror according to claim 1, in combination with an additional sleeve on an intermediate region of said arm for selective connection to one of said struts.

3. A rear-view automotive mirror according to claim 1, said upper framework comprising a pair of forwardly and rearwardly spaced attachment members each adapted for attachment to the fender, and a generally polygonal truss structure connected to and extending outwardly from said attachment members, said connection means being mounted on an inner side piece of said truss structure, and said struts upstanding from corners of said truss structure.

4. A rear-view automotive mirror according to claim 1, in combination with a contractile member extending between intermediate regions of said upper framework and depending frame member, for tightening the same on said fender.

5. A rear-view mirror according to claim 3, said connection means comprising an elongate member having one end connected to said inner side piece of said truss structure for swinging movement about a generally vertical axis, and a sleeve connected to the other end of said elongate member releasably embracing said arm for axial rotative adjustment of said arm, whereby said mirror is swingable with said arm between an operative position with said mirror upright and an inoperative position with said mirror protectively positioned in downwardly facing relation.

* * * * *